United States Patent
Sauers et al.

(10) Patent No.: US 8,068,331 B2
(45) Date of Patent: Nov. 29, 2011

(54) ENCLOSURE TO PREVENT FLUID INGRESS OF A DEVICE HAVING A TOUCH SCREEN INTERFACE

(75) Inventors: Matthew Carlyle Sauers, Indianapolis, IN (US); Manfred Augstein, Mannheim (DE)

(73) Assignees: Roche Diagnostics Operations, Inc., Indianapolis, IN (US); Roche Operations Ltd., Hamilton (BM)

( * ) Notice: Subject to any disclaimer, the term of this patent is extended or adjusted under 35 U.S.C. 154(b) by 1576 days.

(21) Appl. No.: 11/470,329

(22) Filed: Sep. 6, 2006

(65) Prior Publication Data

US 2008/0055258 A1   Mar. 6, 2008

(51) Int. Cl.
  *G06F 1/16*  (2006.01)
(52) U.S. Cl. .................................. 361/679.01; 206/305
(58) Field of Classification Search ............. 361/679.01; 206/305
  See application file for complete search history.

(56) References Cited

U.S. PATENT DOCUMENTS

| | | | |
|---|---|---|---|
| 4,072,340 A | 2/1978 | Morgan | |
| 4,561,625 A | 12/1985 | Weaver | |
| 5,092,459 A * | 3/1992 | Uljanic et al. | 206/320 |
| 5,373,458 A | 12/1994 | Bishay et al. | |
| 5,499,713 A * | 3/1996 | Huffer | 206/320 |
| 5,713,466 A * | 2/1998 | Tajima | 206/320 |
| 5,850,915 A * | 12/1998 | Tajima | 206/320 |
| 6,068,119 A * | 5/2000 | Derr et al. | 206/305 |
| 6,245,262 B1 | 6/2001 | Varaprasad et al. | |
| 6,634,494 B1 * | 10/2003 | Derr et al. | 206/305 |
| 6,646,864 B2 * | 11/2003 | Richardson | 361/679.3 |
| 6,659,274 B2 * | 12/2003 | Enners | 206/305 |
| 6,995,976 B2 * | 2/2006 | Richardson | 345/173 |
| 7,158,376 B2 * | 1/2007 | Richardson et al. | 361/679.56 |
| 7,180,735 B2 * | 2/2007 | Thomas et al. | 361/679.56 |
| 7,230,823 B2 * | 6/2007 | Richardson et al. | 361/679.25 |
| 7,594,576 B2 * | 9/2009 | Chen et al. | 206/320 |
| 7,609,512 B2 * | 10/2009 | Richardson et al. | 361/679.41 |
| 7,663,879 B2 * | 2/2010 | Richardson et al. | 361/679.56 |
| 7,722,536 B2 * | 5/2010 | Goodnow | 600/365 |
| 2003/0111366 A1 | 6/2003 | Enners | |
| 2005/0030707 A1 | 2/2005 | Richardson et al. | |
| 2005/0245799 A1 * | 11/2005 | Brauker et al. | 600/347 |

(Continued)

FOREIGN PATENT DOCUMENTS

DE  29612454 U1  9/1996

(Continued)

OTHER PUBLICATIONS

International Search Report and Written Opinion dated Mar. 12, 2007 for International Application No. PCT/ EP2007/007735.

(Continued)

*Primary Examiner* — Lisa Lea Edmonds

(74) *Attorney, Agent, or Firm* — Dinsmore & Shohl LLP

(57) ABSTRACT

An electronic device enclosure having an integrated in-mold foil, which prevents fluid ingress around an included display of the electronic device, is disclosed. A portion of the in-mold foil is adapted to the specific contour and profile of the display, thereby allowing a user to use a touch screen interface of the display with no shortcomings. In addition, the in-mold foil protects the display from direct chemical attack, and may provide a liquid-tight seal between a button of the electronic device and the enclosure.

26 Claims, 7 Drawing Sheets

U.S. PATENT DOCUMENTS

| | | | |
|---|---|---|---|
| 2006/0015020 A1* | 1/2006 | Neale et al. | 600/309 |
| 2007/0144938 A1* | 6/2007 | Buccinna et al. | 206/811 |
| 2008/0060955 A1* | 3/2008 | Goodnow | 206/305 |

FOREIGN PATENT DOCUMENTS

| | | | |
|---|---|---|---|
| GB | 2 243 013 A | 10/1991 |
| JP | 7249880 A | 9/1995 |
| JP | 2003512866 A | 4/2003 |
| JP | 2004287768 A | 10/2004 |
| JP | 2004534886 A | 11/2004 |
| JP | 2006021355 A | 1/2006 |
| WO | 01/08551 A2 | 2/2001 |
| WO | 03/001776 A1 | 1/2003 |
| WO | 2007051657 A1 | 5/2007 |

OTHER PUBLICATIONS

GE Structured Products; A Guide for Designing, Forming, and Molding with Screenprinted LEXAN® Films; Lexan; Jan. 1999; pp. 1-26; Pittsfield, MA 01201.

Office Action dated Apr. 12, 2011 pertaining to Canadian Application No. 2,662,267.

Office Action dated Jul. 12, 2011 pertaining to Japanese Application No. 2009-527051.

* cited by examiner

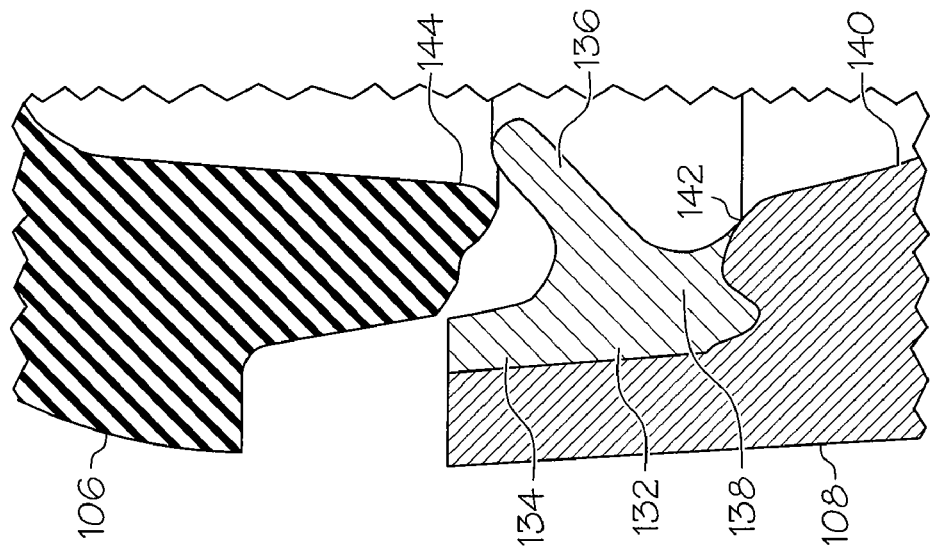
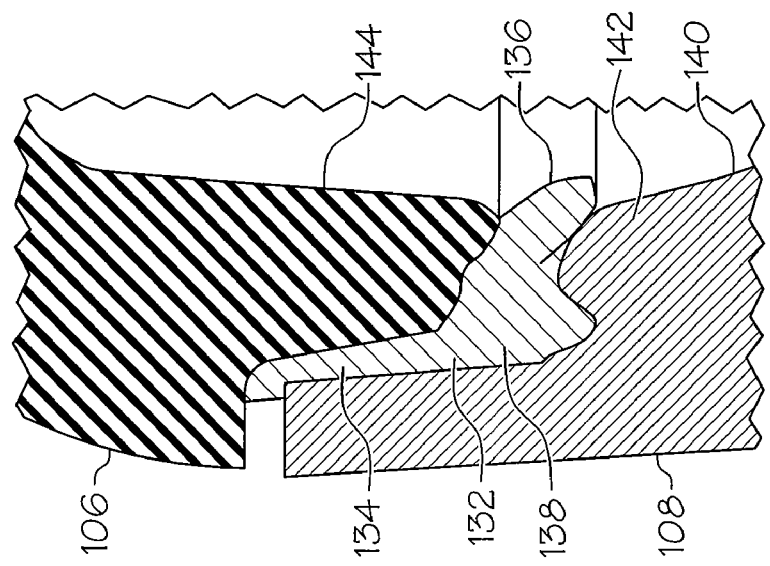

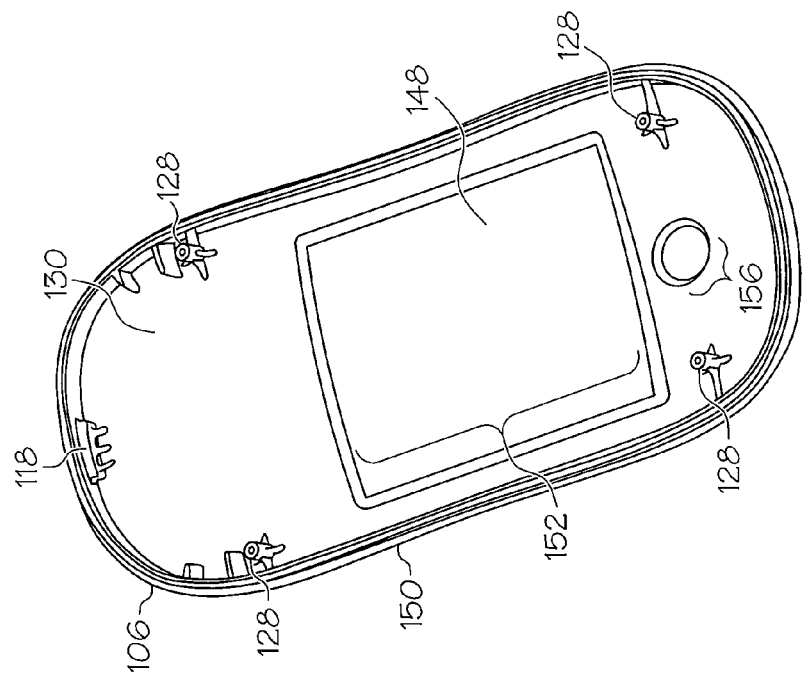
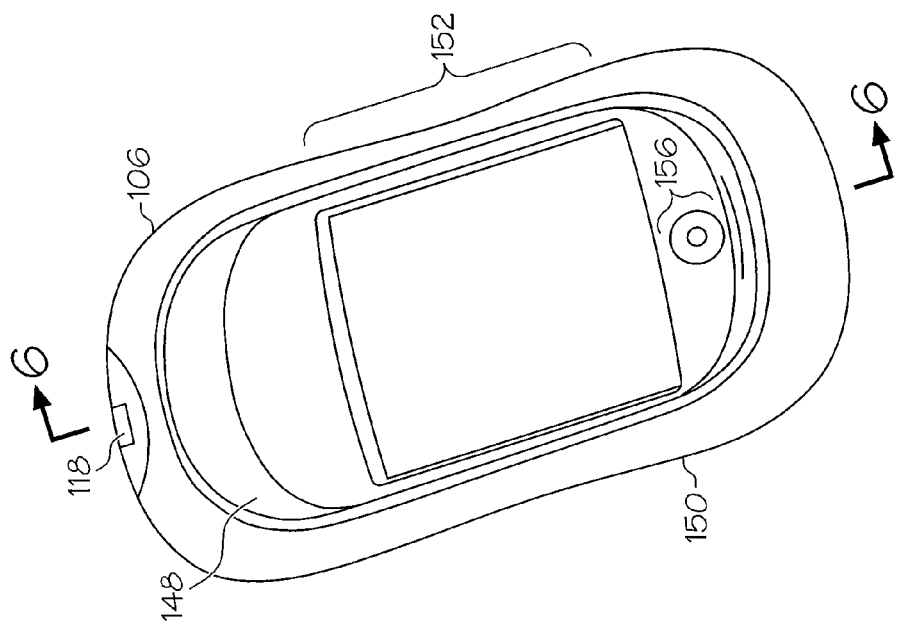
FIG. 5B
FIG. 5A

ENCLOSURE TO PREVENT FLUID INGRESS OF A DEVICE HAVING A TOUCH SCREEN INTERFACE

BACKGROUND OF THE INVENTION

The present invention pertains generally to electronic device enclosures and specifically to an electronic device enclosure having an integrated in-mold foil, which prevents fluid ingress around an included touch screen interface of the electronic device.

A resistive-type touch screen is a sensor consisting of two opposing layers, typically a flexible top layer and a supported bottom layer, each coated with a transparent resistive material called indium tin oxide (ITO). A pattern of very small transparent insulating dots separates the two opposing layers. When a finger or stylus touches the upper surface of the touch screen, electrical contact of the two layers between the span of insulating dots occurs. As the two ITO surfaces mate, the resistance of an electrical load across the screen changes, thereby indicating an output X-Y location of where the screen was touched.

Due to the sensitivity of the touch screen to pressure, there are problems associated with using a rubber gasket which surrounds the touch screen upper surface to prevent fluid ingress into the electronic device reliably. For example, for some use settings, applying the pressure to the gasket that is necessary to keep various chemicals and fluids from seeping in around the touch screen to the interior of the electronic device typically exceeds the sensitivity of the touch screen. As such, the touch screen in the vicinity around the gasket will register continually a touch, thereby making the touch screen unresponsive. Furthermore, using a gasket does not protect the upper surface of the touch screen from the environment. In some use settings, exposing the touch screen to various chemicals can cause damage (e.g., pitting, fading, weakening, hardening) to the flexible top layer.

A similar issue exists for the button(s) on a meter, where a button that deflects will open a hole through the housing, thus allowing a liquid breach. This can be problematic in some use settings, such as a hospital. As hospital meters are cleaned with corrosive fluid cleaners (e.g., bleach) daily, preventing fluid ingress and protecting the internal electronics and the touch screen from exposure to such cleaners is imperative for robustness.

SUMMARY OF THE INVENTION

It is against the above background that the present invention provides an electronic device enclosure having an integrated in-mold foil, which prevents fluid ingress around an included touch screen interface of the electronic device. A portion of the in-mold foil is adapted to the specific contour and profile of the touch screen interface, thereby allowing a user to use the touch screen interface with no shortcomings. In addition, the in-mold foil protects the touch screen interface from direct chemical attack, and may provide a liquid-tight seal between a button of the electronic device and the enclosure.

In one embodiment, provided is a protective enclosure for an electronic device with a display. The protective enclosure comprises a molded front housing sized to accommodate the electronic device, and a polymer in-mold foil integral with the front housing. The in-mold foil provides a liquid-tight seal with the front housing which protects against fluid ingress from the front housing around the display. The in-mold foil includes a screen covering portion overlaying the display. The display can be a touch screen interface, and the screen covering portion can be configured to permit operation of the touch screen interface through the screen covering portion.

In another embodiment, provided is an electronic device that comprises a display, and a protective enclosure. The protective enclosure comprises a molded front housing sized to accommodate the electronic device, and a polymer in-mold foil integral with the front housing. The in-mold foil includes a screen covering portion for overlaying the display and provides a liquid-tight seal with the front housing to prevent fluid ingress from the front housing around the display.

These and other features and advantages of the invention will be more fully understood from the following description of various embodiments of the invention taken together with the accompanying drawings.

BRIEF DESCRIPTION OF THE DRAWINGS

The following detailed description of the embodiments of the present invention can be best understood when read in conjunction with the following drawings, where like structure is indicated with like reference numerals, and in which:

FIG. 3A is a close-up cross-section view taken along section line 3A of FIG. 2, and showing a sealing engagement between front and rear housings of a protective enclosure according to an embodiment of the present invention;

FIG. 3B is a close-up cross-section view of the front and rear housing of FIG. 2 before the sealing engagement of FIG. 3A;

FIGS. 5A and 5B are front and back perspective views, respectively, of a front housing according to an embodiment of the present invention after molding a cabinet to the foil of FIG. 4;

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the various embodiments of the present invention.

DETAILED DESCRIPTION

Figure 1B:
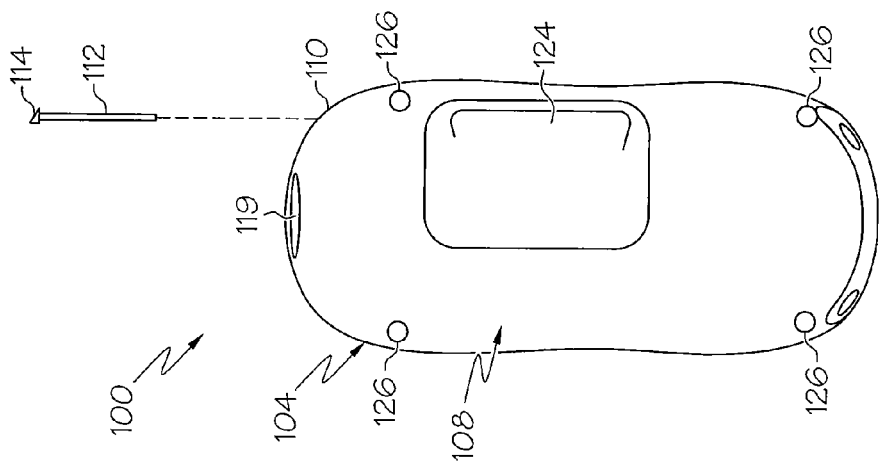
FIGS. 1A and 1B are front and back views, respectively, of an electronic device with a touch screen interface and having a protective enclosure according to an embodiment of the present invention.
Figure 1A:
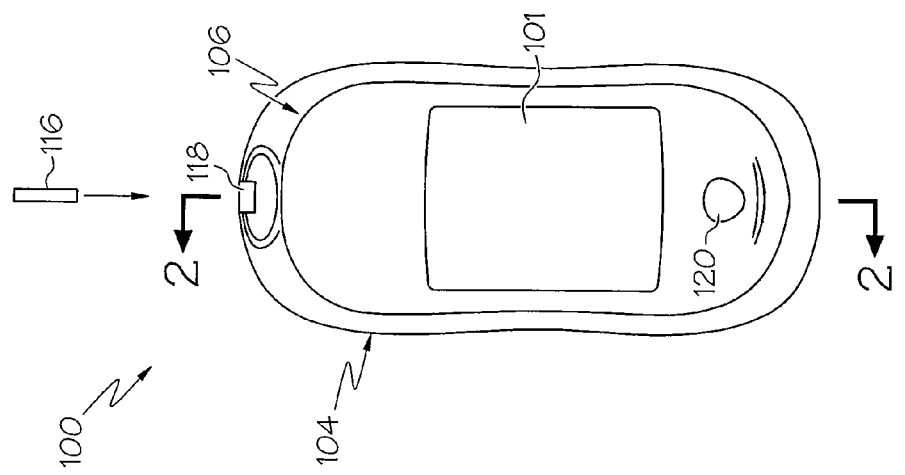
Figure 2:
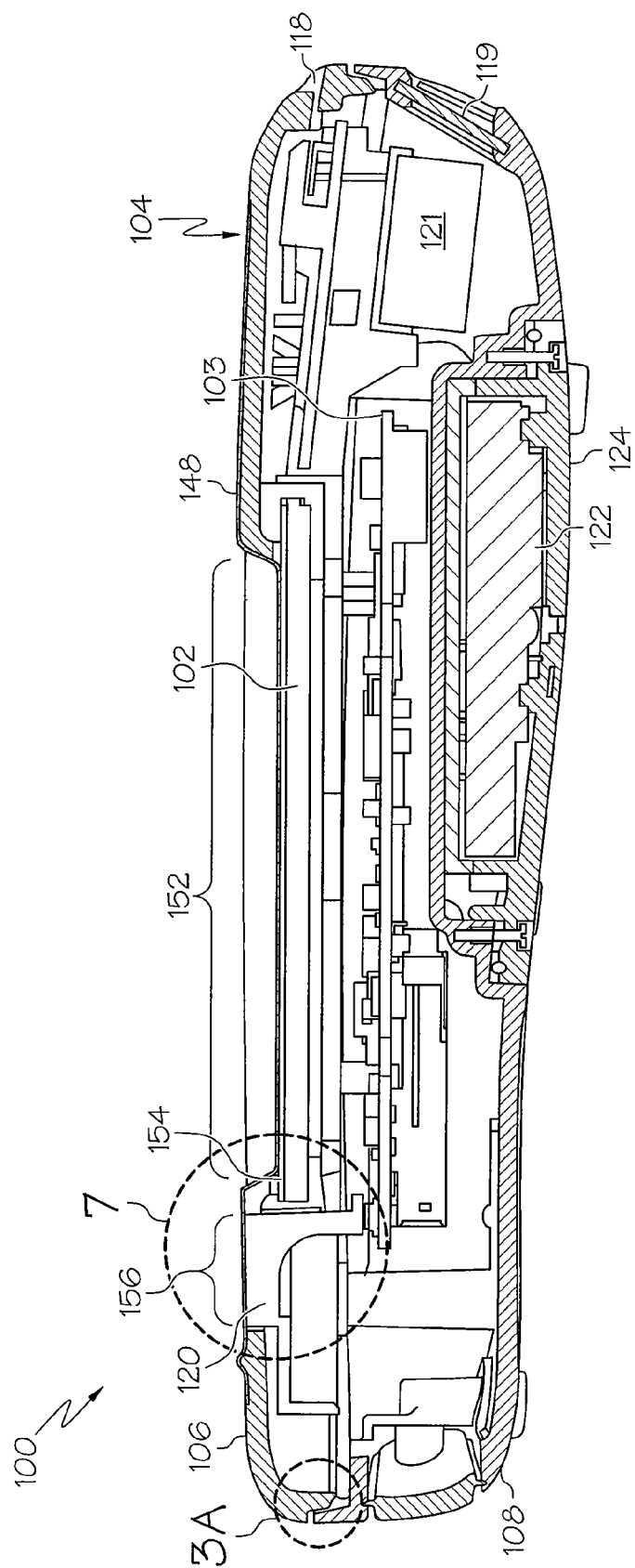
FIG. 2 is a cross-section of the device taken along section line 2-2 of FIG. 1A.

FIGS. 1A and 1B are front and back views, respectively, of a portable, handheld electronic device 100 with a display 101 and having a protective enclosure, generally indicated by symbol 104, according to an embodiment of the present invention. The display 101 in the illustrated embodiment is a touch screen interface 102, which is best shown by FIG. 2, and in other embodiments may be any conventional display device used in a portable, handheld electronic device.

The protective enclosure 104 comprises a molded front housing 106 (FIG. 1A) and rear housing 108 (FIG. 1B). Optionally, a receptacle 110 for a stylus 112 may be provided in the rear housing 108. The stylus 112 generally resembles a conventional writing implement with a rounded plastic tip. The stylus 112 includes a top fitting 114, which mates releasably with and closes the receptacle 110.

Electronic device 100 in one embodiment is a handheld reagent-based glucose monitor, which measures glucose concentration by observing some aspect of a chemical reaction between a reagent and the glucose in a fluid sample. The reagent is a chemical compound that is known to react with glucose in a predictable manner, enabling the monitor to determine the concentration of glucose in the sample. For example, the monitor may be configured to measure a voltage or a current generated by the reaction between the glucose and the reagent. A small test strip 116 is often employed to hold the reagent and to host the reaction between the glucose and the reagent. Accordingly, in this embodiment, the protective enclosure 104 is provided with a strip port 118 for inserting the test strip 116 into the electronic device 100, such that the reaction between the glucose and the reagent may be read in order for the electronic device 100 to determine the concentration of glucose in the sample.

In other embodiments, the electronic device 100 may be a conventional personal digital assistant (PDA), cell phones, satellite phones, telemetric devices, or similar electronic devices which use a touch screen interface 102 for display and data entry. For example, and not to be limited by, such similar electronic devices that have a touch screen interface 102 include instruments such as voltmeters, oscilloscopes, logic analyzers, and any other hand held, bench top, or rack mounted instrument that has a touch screen interface. Additionally, the term "electronic device" may comprise barcode scanners, hand held GPS receivers, and other handheld electronic devices. The foregoing description of the term "electronic device" has been presented for purposes of illustration and description. It is not intended to be exhaustive or to limit the invention to the precise forms disclosed, and other modifications and variations may be possible in light of the teachings of this specification. Accordingly, the shape and dimensions of front and rear housings 106 and 108 of the protective enclosure 104 may vary for each manufacturer and model of the electronic device 100.

The touch screen interface 102 is conventional, and in one embodiment comprises either a color or a black and white liquid crystal display with a touch sensitive device mounted on top of the display. The touch screen interface 102 is used for displaying graphics, text, and other elements to the user. The touch screen interface 102 may be used with the tip of a finger of a user and/or the stylus 112 to select elements from the screen, to draw figures, and to enter text with a character recognition program in the electronic device 100.

The electronic device 100 may have at least one button as part of the user interface. In the illustrated embodiment, use of a button, such as a power button 120, is provided on the front housing 106 of the electronic device 100, near the touch screen interface 102. In other embodiments, additional buttons may be used as shortcut buttons to instantly call up a certain program on the electronic device 100, may comprise a method of scrolling, may be used to select items from a list, or may have any function that the designer of the device software may assign to the button or set of buttons. The button size, layout, and function may vary for each manufacturer and model of the electronic device 100.

In addition, the electronic device 100 has at least one method of connecting to another device or computer. In one embodiment, this may be through a direct electrical connection, such as through a wire cable or fiber optic. In another embodiment, this may be through another medium such as infrared communication or through a radio communication.

With reference made also to FIG. 2, a section view of the electronic device 100 taken through the section line 2-2 shown in FIG. 1A is illustrated. As shown, the electronic device 100 includes a rechargeable or non-rechargeable battery 122 as a power source. The battery 122 is provided in a battery compartment that is accessed from a panel 124 (see FIG. 1B) provided in the rear housing 108. Additional power, such as for recharging the battery 122, may be provided from a remote source of electricity that is transmitted to the electronic device 100 through a wire cable or through other methods of electrical transmission. The electronic device 100 may have indicator lights, such as status lights for power, communication, battery status, or other functions. The lights may be located on any of the sides of the device, and may be viewable on one or more sides.

Front housing 106 and rear housing 108 together forms the protective enclosure 104 for internal components, such as a microprocessor/motherboard 103 and the touch screen interface 102 of the electronic device 100. The microprocessor/motherboard 103 and other internal components of the electronic device 100 may be mounted in the protective enclosure 104 using many different mounting techniques. For example, the microprocessor/motherboard 103 may be mounted using open or closed cell foam inserts in the protective enclosure 104. In another embodiment, the microprocessor/motherboard 103 may be mounted by attaching the microprocessor/motherboard 103 to an interior side of one of the housings 106 and 108 with a fastener. In another embodiment, the microprocessor/motherboard 103 may be mounted by a snap fit with an interior side of one of the housings 106 and 108. Those skilled in the art may use other types of locating and holding mechanisms without deviating from the spirit of the present invention.

In all embodiments without the strip port 118, the protective enclosure 104 is watertight, chemically resistant, dust proof, and provides some shock protection of the internal components should the electronic device 100 be dropped. Even in the embodiment with the strip port 118, the enclosure 104 provides similar protections as the embodiments without the strip port, if the electronic device 100 is exposed to general cleaning procedures (e.g., device wipe-down with a chemical cleaner) using ordinary care. To seal the protective enclosure 104, in one embodiment the front housing 106 and rear housing 108 are joined together by fasteners 126 (FIG. 1B) extending from the rear housing 108. The fasteners 126 mate with an associated insert portion 128, shown in FIG. 5B, which is provided on an interior surface 130 of the front housing 106.

FIG. 3A is a close-up cross-section view taken along section line 3A of FIG. 2. The protective enclosure 104 is made watertight by a gasket 132 provided between the front and rear housings 106 and 108. FIG. 3B is a close-up section view of the gasket 132 before the sealing engagement between the housings 106 and 108 depicted by FIG. 3A. The gasket 132 is approximately Y-shaped in a non-deformed state, such as when the front housing 106 is not mated closely to the rear housing 108, as illustrated by FIG. 3B. Upon tightening down on fasteners 126, gasket 132 deforms wherein one upper portion 134 of the gasket 132 is squeezed upwards between the front and rear housings 106 and 108, and another upper portion 136 of the gasket 132 is squeezed downwards between the front housing 106 and a lower portion 138 of the gasket 132.

In one embodiment, the gasket 132 is molded to an interior side 140 of the rear housing 108. In one embodiment, the gasket 132 is molded adjacent and above an inner lip portion 142 of the rear housing 108 that is provided on the interior side 140. The gasket 132 and the lip portion 142 encircle the entire interior side 140 of the rear housing 108. The front housing 106 provides a complimentary lip portion 144, such that the squeezing of the gasket therebetween forms a suitable watertight seal. Those skilled in the art may use other designs of forming a watertight seal without deviating from the scope and intent of the present invention. The construction of the protective cover 104 is provided hereafter.

The rear housing 108 may be constructed of rigid plastic, metal, flexible rubber, or any other type of material that could be adapted to afford the protection of the electronic device 100 desired for the application. For example, a metal rear housing 108 may be used in an application where an elegant style is desired. A flexible rubber rear housing 108 may be selected for an application in a wet environment. A rigid plastic rear housing 108 may be selected for an application where dropping the device 108 is a concern. Those skilled in the art may use other types of materials and constructions without deviating from the spirit of the present invention.

Figure 4:
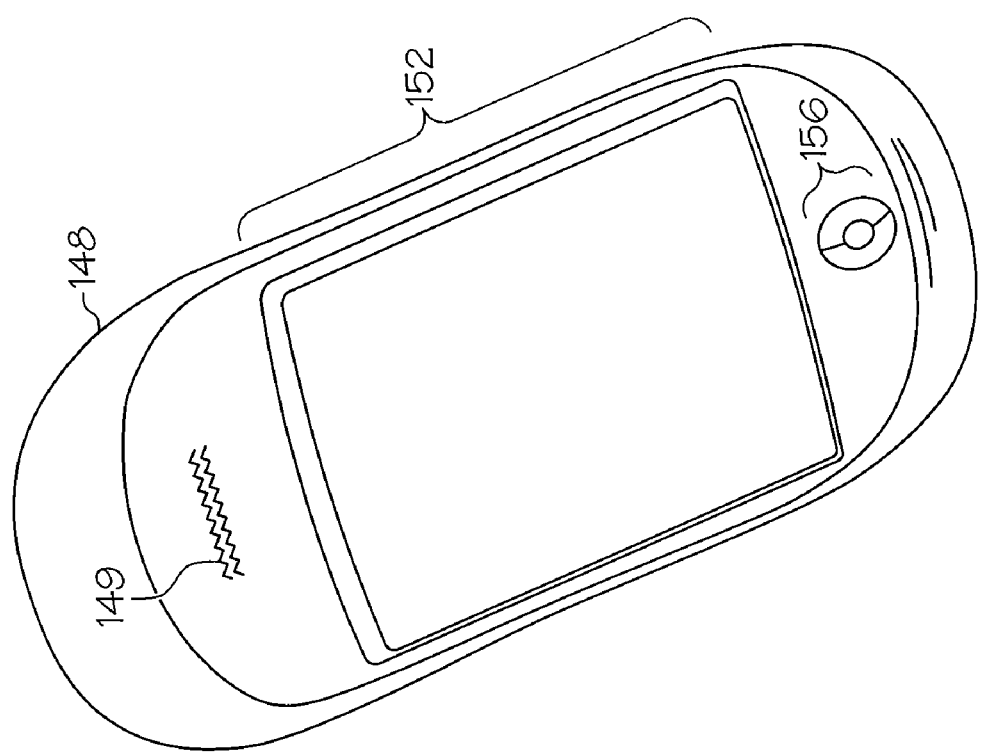
FIG. 4 is a perspective view of an in-mold foil according to an embodiment of the present invention as thermoformed and before injection molding of a cabinet encapsulating portions thereof.
Figure 7:
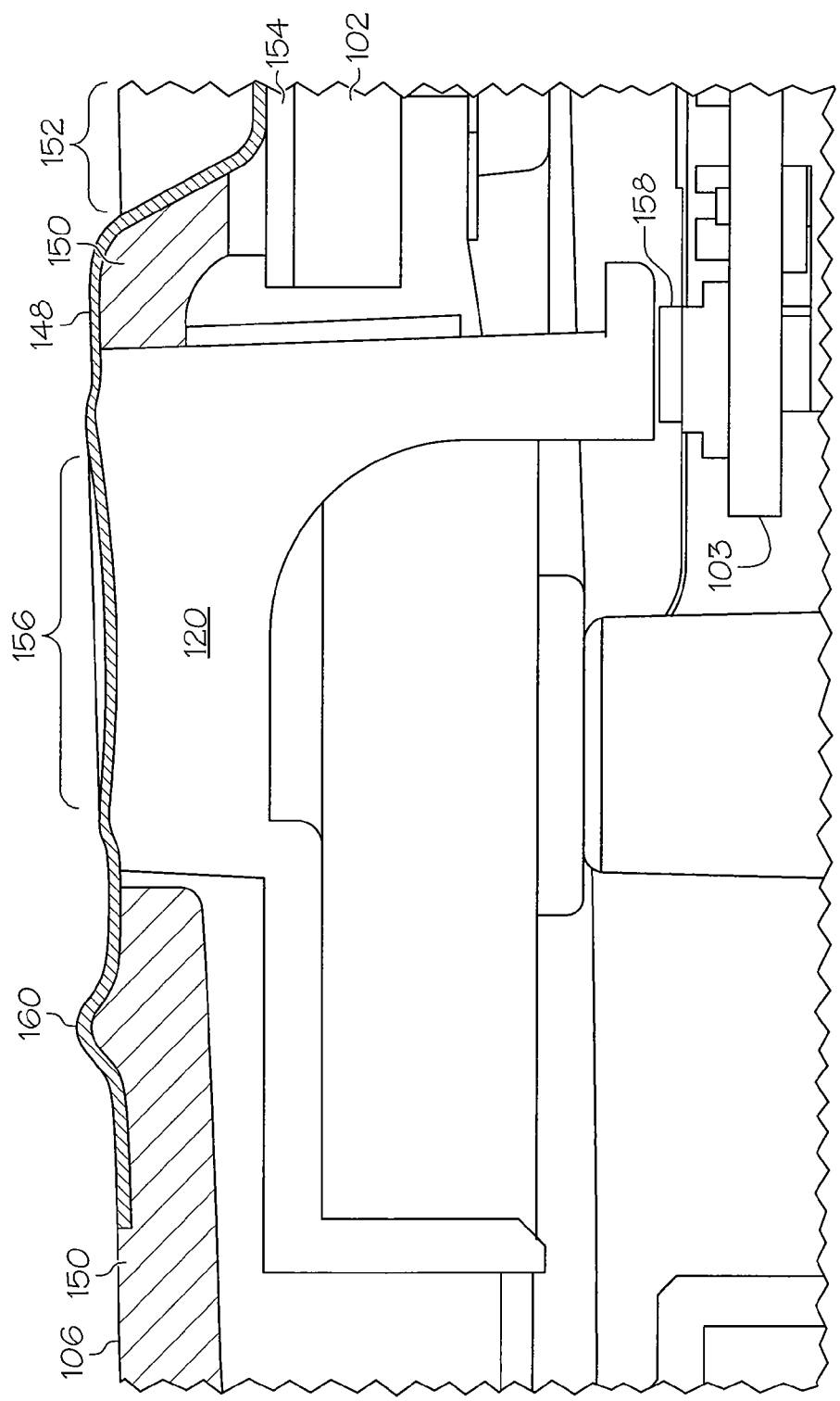
FIG. 7 is a close-up cross section view of a button area of the front housing taken along section line 7 of FIG. 2.

The front cover 106 comprises a polymer foil 148, which is shown by FIG. 4, integral to a molded cabinet 150, which is shown by FIGS. 5A and 5B. The foil 148 provides a large unsupported area or screen covering portion 152, which is sized to overlay or contour to the profile of the outer film layer 154 of the touch screen interface 102, which is best shown by FIG. 2. The foil 148 also provides a button covering portion 156 which is also sized to overlay or contour to the button 120, which is best shown by FIG. 7. The foil 148 in one embodiment may be translucent or at least partially transparent, so that the images displayed on the touch screen interface 102 may be visible through the screen covering portion 152.

In the embodiments having a touch screen interface 102, the foil 148 is selected to be thin enough that deformation by a finger or stylus 112 conducts a touch to the touch screen interface 102, but thick enough to have enough rigidity that the finger or stylus 112 does not catch and rip the foil 148. Additionally, the foil 148 should have enough thickness to endure scratches and other wear and tear without breaking and sacrificing the protective function. In one embodiment, the in-mold foil 148 is a polymer material having a thickness in the screen covering portion 152 in a range from about 0.005 inch to about 0.035 inch. For embodiments having a display 101 that is not a touch screen interface, a thicker film for the in-mold foil 148 in the screen covering portion 152 may be used, for example, about 0.040" thick or thicker as flexibility in the screen covering portion 152 is not required.

In one embodiment, the polymer material for the front housing 106 and rear housing 108 is a thermoplastic alloy blend of polybutylene terephthalate (PBT) and polycarbonate (PC), which is available under the trademark Xenoy®, which is produced by General Electric. In another embodiment, the polymer material for the in-mold foil 148 is a polycarbonate material. In still other embodiments, alternative materials for the front housing 106, rear housing 108, and the in-mold foil 148, such as for example, a polyvinylchloride material and other polymers, may be used by those skilled in the art to achieve the same results while maintaining within the spirit and intent of the present invention.

The foil 148 is formed by an in-mold injection process. In a first step, a surface of a flat polycarbonate film is optionally decorated with decorations 149 by a printing process (e.g., screen printing, lithographic printed, etc.). The decorations 149 may incorporate logos or graphics for the brand identity of the device 102, and text, graphics, or labeling for individual buttons for the device, for designating an area on the touch screen interface 102 for a specific function, and/or for aesthetic purposes. Other decorative processes, such as colorizing/tinting or adding other components to the raw material, such as metal flakes or other additives, may be used to change the optical features of the foil 148, and housings 106 and 108.

After decorating, the film is then worked via thermoforming or cold forming to provide desired features, such as for example, the screen covering portion 152 and the button covering portion 156. Next, the worked film is die-cut to size, positioned, and secured into an injection molding tool designed for in-mold injection. Resin is injected onto the film and the foil 148, which requires little or no secondary operations, is ejected from the molding tool.

Figure 6:
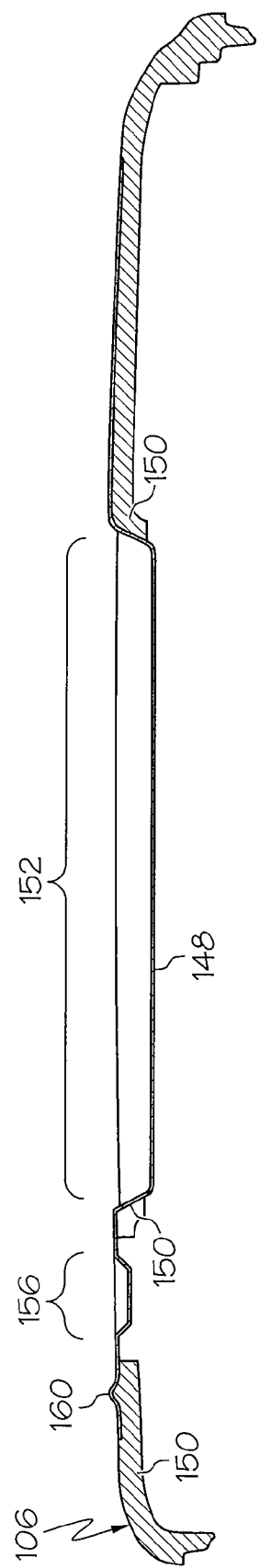
FIG. 6 is a cross-section of the front housing taken along section line 6-6 of FIG. 5A.

The foil 148 is then bonded to the molded cabinet 150. FIG. 6 illustrates a section view of the front housing 106 taken through the section line 6-6 shown in FIG. 5A. Some parts of the molded cabinet 150 are removed for easy of illustration. In the illustrated embodiment of FIG. 6, the screen covering portion 152 is a recessed area that extends a majority of the length of the foil 148, which is unsupported by the cabinet 150 (i.e., cabinet 150 does not provide ribs or other molded support features). Similarly, the button covering portion 156 of the foil 148 is also a recessed area that is also unsupported by the cabinet 150.

It is to be appreciated that the use of these unsupported areas provides a degree of resiliency to the foil 148 after being bonded to the cabinet 150. For example, and with reference made to FIG. 7, the resiliency of the button covering portion 156 of the foil 148 permits a user to depress the overlaid button 120 such that contact is made between the button 120 and a switch 158 of the processor/motherboard 103. When released by the user, the button 120, being spring biased, will push against the button covering portion 156, which slightly gives, thereby returning the button 120 to a normal non-contact position. Similarly, and with reference made to FIG. 2, the resiliency of the screen covering portion 152 of the foil 148 permits a user to use a finger or the stylus 112 on the surface of the screen covering portion 152. Pressing of the finger or stylus onto the surface of the screen covering portion 152 deflects the outer film layer 154 of the touch screen interface 102, thus changing the resistance of the load across the screen, and indicating an output X-Y location of where the screen was pressed.

Viewing FIG. 6, a raised portion(s) 160 may also be provided to the foil 148 for functional and/or decorative reasons. For example, in the illustrated embodiment, the raised portion 160 is provided as a means to help a user to tactilely locate the button 120 overlaid with the button covering portion 156 of the foil 148. In addition, if the face of front housing 106 of the electronic device 100 is in contact with any flat surface, the raised portion 160 prevents the power button 120 (FIG. 7) from being pressed. The raised portion 160 is also beneficial in a face-drop situation of the electronic device 100 to prevent a load from hitting the power button 120 directly, thus reducing the force that the switch 158 of the processor/motherboard 103 may experience from button 120 during impact.

In one embodiment, the foil 148 is bonded to the molded cabinet 150 by a thermal fusion process during injection molding of the cabinet 150. This thermal fusion process, which is due to chemical affinity of the materials activated by the heat of the molding process, ensures that the bond between the foil 148 and cabinet 150 will not weaken over time and does not rely on chemistry of an adhesive. In an alternative embodiment, the foil 148 can be attached to the cabinet 150 by after molding. The attachment of the foil 148 to the cabinet 150 in this alternative embodiment can be accomplished via a variety of processes, for example, thermal bonding (thermal weld or fuse, heat staking), ultrasonic welding, spin welding, adhesive bonding, and the likes.

It is to be appreciated that the polymer foil 148 functions as both a touch screen protector as well as a means to seal out fluid ingress around the touch screen interface 102. The foil 148 provided to the protective enclosure 104 also solve the issue of fluid ingress via apertures, such as normally provided around a button, in front housing 106. Furthermore, the use of the polymer foil 148 provides protection to the touch screen from chemical attack and mechanical damage (e.g., scratches) during normal use.

The present invention is suitable for electronics devices which may incorporate a touch screen in an application where liquids are exposed to the device, such as for example, medical devices. Medical devices are often transported into patient areas and exposed to blood. Accordingly, the protective enclosure 104 having an integrated foil 148 in a front housing 106 and a watertight seal between housing 106 and 108, permits the electronic device 100 to be disinfected easily using a chemical cleaner without liquid ingress, and also providing protection of the display screen against chemical attack from the chemical cleaner.

The foregoing description of the invention has been presented for purposes of illustration and description. It is not intended to be exhaustive or to limit the invention to the precise form disclosed, and other modifications and variations may be possible in light of the above teachings. The above embodiments disclosed were chosen and described to explain the principles of the invention and its practical application to thereby enable others skilled in the art to best utilize the invention. It is intended that the appended claims be construed to include other alternative embodiments of the invention except insofar as limited by the prior art.

What is claimed is:

1. A protective enclosure for an electronic device with a display comprising:
    a molded front housing sized to accommodate the electronic device; and
    a polymer in-mold foil integral with said front housing and providing a liquid-tight seal with said front housing which protects against fluid ingress from said front housing around the display, said in-mold foil includes a screen covering portion overlaying the display.

2. The protective enclosure according to claim 1, wherein said display is a touch screen interface.

3. The protective enclosure according to claim 2, wherein said screen covering portion is configured to permit operation of the touch screen interface through said screen covering portion.

4. The protective enclosure according to claim 1, wherein said in-mold foil further includes a button covering portion which permits operation of a button of the electronic device overlaid by said button covering portion, said liquid-tight seal between said in-mold foil and said front housing also protects against fluid ingress from said front housing around said button.

5. An electronic device comprising:
    a display; and
    a protective enclosure which comprises:
        a molded front housing sized to accommodate the electronic device; and
        a polymer in-mold foil integral with said front housing, said in-mold foil includes a screen covering portion for overlaying the display and provides a liquid-tight seal with the front housing to prevent fluid ingress from the front housing around the display.

6. The electronic device according to claim 5, wherein said in-mold foil further includes a button covering portion which permits operation of a button of the electronic device overlaid by said button covering portion, said liquid-tight seal between said in-mold foil and said front housing also protects against fluid ingress from said front housing around said button.

7. The electronic device according to claim 5, further comprising a molded rear housing which engages sealing with said front housing.

8. The electronic device according to claim 5, wherein said protective enclosure includes a receptacle for a stylus.

9. The electronic device according to claim 5, wherein said electronic device is a handheld reagent-based glucose monitor.

10. The electronic device according to claim 5, wherein said protective enclosure provides a port for inserting a test strip into the electronic device.

11. The electronic device according to claim 5, wherein said protective enclosure is formed from a chemically resistant material.

12. The electronic device according to claim 5, further comprising a rear housing, wherein said protective enclosure is made watertight by a gasket provided between the front and rear housings.

13. The electronic device according to claim 5, further comprising a rear housing, wherein said protective enclosure is made watertight by a gasket provided between the front and rear housings, said gasket is molded to an interior side of the rear housing.

14. The electronic device according to claim 5, further comprising a rear housing, wherein said protective enclosure is made watertight by a gasket provided between the front and rear housings, said gasket is molded adjacent and above an inner lip portion of the rear housing, wherein said front housing provides a complimentary lip portion, such that the squeezing of the gasket therebetween forms a suitable watertight seal.

15. The electronic device according to claim 5, wherein said in-mold foil is bonded to a cabinet of said front housing.

16. The electronic device according to claim 5, wherein said screen covering portion is a large unsupported recessed area of the in-mold foil, which is sized to overlay an outer film layer of said display.

17. The electronic device according to claim 5, wherein said in-mold foil is at least partially transparent, so that images displayed on said display may be visible through said screen covering portion.

18. The electronic device according to claim 5, wherein said in-mold foil is a polycarbonate material.

19. The electronic device according to claim 5, wherein said in-mold foil has decorations.

20. The electronic device according to claim 5, wherein said in-mold foil further includes a button covering portion which permits operation of a button of the electronic device overlaid by said button covering portion and provides a liquid-tight seal between the button and said front housing, wherein said button covering portion is an unsupported recessed area of said in-mold foil.

21. The electronic device according to claim 5, wherein said in-mold foil includes a raised portion provided above said screen covering portion, said screen covering portion being an unsupported recessed area of said in-mold foil.

22. The electronic device according to claim 5, wherein said in-mold foil includes a raised portion and a button covering portion, said screen covering portion and said button covering portion both being unsupported recessed areas of said in-mold foil, said button covering portion permits operation of a button of the electronic device overlaid by said button covering portion and provides a liquid-tight seal between the button and said front housing.

23. The electronic device according to claim 5, wherein said in-mold foil is integral with said front housing via a thermal bond.

24. The electronic device according to claim 5, wherein said display is a touch screen interface.

25. The electronic device according to claim 5, wherein said in-mold foil has a thickness in said screen covering portion in a range from about 0.005 inch to about 0.035 inch.

26. The electronic device according to claim 5, wherein said in-mold foil is integral with said front housing via an adhesive bond, an ultrasonic weld or a spin weld.

* * * * *

UNITED STATES PATENT AND TRADEMARK OFFICE
CERTIFICATE OF CORRECTION

| | | |
|---|---|---|
| PATENT NO. | : 8,068,331 B2 | Page 1 of 1 |
| APPLICATION NO. | : 11/470329 | |
| DATED | : November 29, 2011 | |
| INVENTOR(S) | : Sauers et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1382 days.

Signed and Sealed this
Seventeenth Day of April, 2012

David J. Kappos
*Director of the United States Patent and Trademark Office*